No. 859,426. PATENTED JULY 9, 1907.
F. M. BETZ.
FLEXIBLE PIPE JOINT.
APPLICATION FILED OCT. 10, 1906.
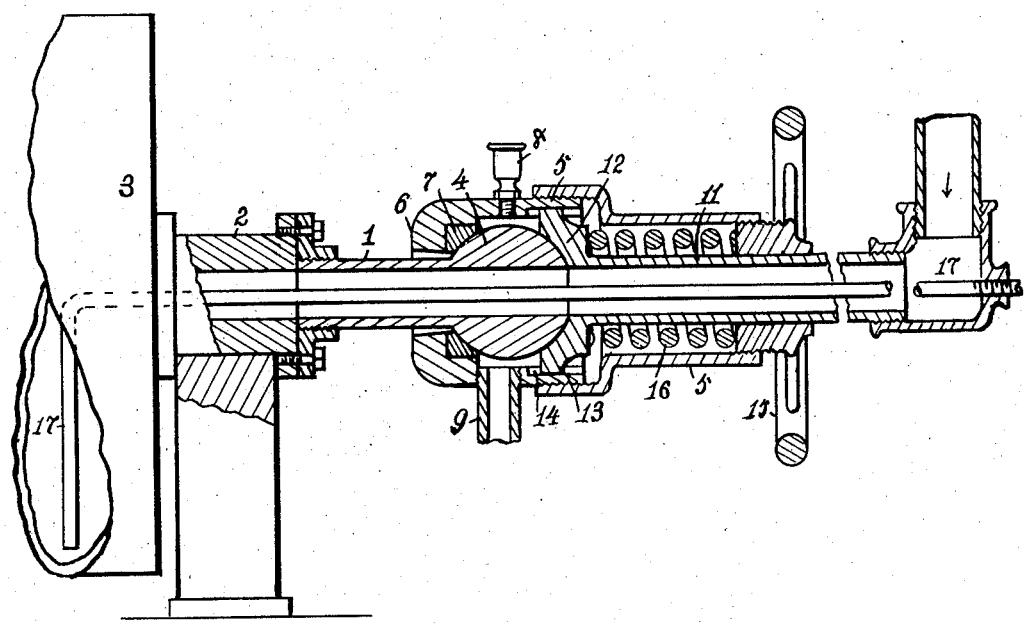

UNITED STATES PATENT OFFICE.

FREDERICK M. BETZ, OF HAMILTON, OHIO.

FLEXIBLE PIPE-JOINT.

No. 859,426.  Specification of Letters Patent.  Patented July 9, 1907.

Application filed October 10, 1906. Serial No. 338,274.

*To all whom it may concern:*

Be it known that I, FREDERICK M. BETZ, a citizen of the United States, residing at Hamilton, Ohio, have invented a new and useful Improvement in Flexible Pipe-Joints, of which the following is a specification.

My invention relates to flexible pipe joints of the class adapted to use on rotative steam driers or elsewhere, and the objects of my improvement are to provide means for a stationary steam pipe to form an angle with the axis of the rotative member; to provide means for yieldingly maintaining the joint closed; to provide adjustable means for the escape of steam through the joint at predetermined pressures that it may serve for a safety valve; to provide means for lubricating the moving parts; to provide an exit for the condensed steam, and to provide a simple, compact, durable and efficient structure. These objects are attained in the following described manner as illustrated in the accompanying drawings, in which:—The figure shows a longitudinal diametrical section of a flexible pipe joint embodying my improvements.

In the drawings, 1 represents the rotative member of a steam pipe attached to the end of hollow journal 2 of a rotative cylindrical drier 3 and provided with a hollow sphere or ball 4 on its front end. Sleeve 5 encircles the ball 4 without contact therewith, and is provided with a rear socket 6 which encircles member 1 of the pipe without contact and contains a ring 7 of preferably vulcanized fiber packing for movable contact with the rear portion of the ball. Said sleeve is provided with a lubricating cup 8 and with a depending drip or steam discharge pipe 9.

The stationary member 11 of the steam pipe is provided with a socket 12 on its rear end wherein the ball 4 is movably seated and preferably ground to form a steam tight joint. Said socket is provided with ears 13 which are longitudinally movable in grooves 14 formed in the sleeve to keep it from turning therein. A hand wheel 15 turns on the member 11 of the pipe and is adjustably threaded in the front end of sleeve 5. A helical compression spring 16 encircles member 11 of the pipe within sleeve 5 between socket 12 and the hand wheel and serves to yieldingly maintain said socket in contact with the ball. The exertion of said spring may be regulated as desired by means of the hand wheel for the escape of steam through the joint and the discharge pipe 9 at any desired predetermined pressure and permits the joint to serve for a safety valve to prevent the explosion of the drier. The usual siphon pipe 17 may be extended through the steam pipe and the joint therein for the discharge of the condensed steam from the drier.

In operation, the stationary member of the steam pipe may form an angle with the rotative member thereof. The pressure of the steam partially counteracting the force of the helical spring relieves the front socket on the stationary member of the steam pipe and the ball from excessive wear.

Should the steam exceed a predetermined pressure the exertion of the helical spring as adjusted by means of the hand wheel will be overcome and the front socket will be forced from contact with the ball for the escape of the steam through the drip or discharge pipe. Either or both of the sockets may be ground to fit the ball or provided with packing rings as desired.

Having fully described my improvement, what I claim as my invention and desire to secure by Letters Patent of the United States is:—

1. The combination of a rotative pipe provided with a hollow ball, a stationary pipe in approximate alinement therewith and provided with a socket wherein the ball is movably seated, a sleeve provided with a socket which loosely encircles the rotative pipe, a packing ring interposed therebetween and the ball, a helical spring encircling the stationary pipe in contact with the socket thereon, and means adjustable in the sleeve for controlling the yielding exertion of the spring in maintaining said socket in contact with the ball.

2. The combination of a rotative pipe provided with a hollow ball on one end, a sleeve loosely encircling the ball and provided with a socket loosely encircling said pipe, a stationary pipe provided with a socket on one end adapted to contact with the opposite face of the ball, means adjustable in said sleeve for yieldingly maintaining said sockets in clamping contact with the ball under predetermined pressures and a steam discharge opening in the sleeve between said sockets.

3. The combination of a pipe provided with a ball on one end, a sleeve inclosing said ball and provided with a discharge opening, sockets supported thereby and adjustable means for yieldingly maintaining said sockets in contact with opposite portions of the ball under a predetermined pressure.

4. The combination of a pipe consisting of a rotative and a stationary member in approximate alinement, a spherical bearing formed on one of said members, a socket therefor formed on the other said member, a sleeve loosely encircling said bearing and provided with a discharge opening, a socket formed thereon and loosely encircling said former member, a packing ring interposed therebetween and the ball, and means adjustable in the sleeve for maintaining said sockets in clamping contact with the ball under a predetermined pressure.

5. The combination of a pipe provided with a ball on one end, a sleeve provided with a lateral discharge opening and with a socket in one end loosely encircling the pipe, a socket movable within the sleeve, and adjustable means for yieldingly clamping the ball between the sockets.

6. A flexible pipe joint having in combination a ball, sockets therefor and adjustable means provided with a discharge opening between the sockets and adapted to maintain the sockets in clamping contact with the ball.

FREDERICK M. BETZ.

Witnesses:
P. L. BROCKARDT,
M. HAMILL.